C. KRÄMER.
ELECTRIC REVERSING GEAR.
APPLICATION FILED MAY 10, 1909.
1,071,522.
Patented Aug. 26, 1913.
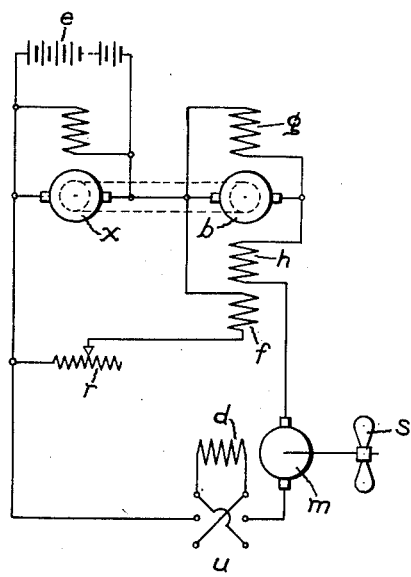
Witnesses:
Helen Oxford
Benjamin B. Hull
Inventor:
Christian Krämer,
by
His Attorney.

UNITED STATES PATENT OFFICE.

CHRISTIAN KRÄMER, OF FRANKFORT-ON-THE-MAIN, GERMANY, ASSIGNOR TO THE FIRM OF FELTEN & GUILLEAUME-LAHMEYERWERKE AKTIEN GESELLSCHAFT, OF FRANKFORT-ON-THE-MAIN, GERMANY.

ELECTRIC REVERSING-GEAR.

1,071,522. Specification of Letters Patent. Patented Aug. 26, 1913.

Application filed May 10, 1909. Serial No. 495,030.

*To all whom it may concern:*

Be it known that I, CHRISTIAN KRÄMER, a subject of the German Emperor, and a resident of Frankfort-on-the-Main, Germany, have invented certain new and useful Improvements in Electric Reversing-Gears, of which the following is a specification.

This invention relates to dynamo electric machinery and in particular to means for driving a motor at various speeds in either direction.

In certain classes of motors, especially in motors used for driving submarines, it is necessary that the motor be reversed quickly. Where the speed of the motor is varied by a reversible counter-electromotive force machine the system is open to the objection that there is a retardation of the time constant of the field, the excitation following only very slowly the value given by the regulator. Therefore when the motor is suddenly reversed there is produced a direct short circuit with a pressure equal to double the circuit pressure.

In accordance with this invention the circuit is provided with means whereby the value of the current is maintained constant irrespective of the resistance of the circuit, and means are provided for varying the value of the constant current and thus the speed of the motor.

Preferably, a regulating dynamo-electric machine is connected with its armature in series circuit with a source of constant potential current. The regulating machine may be provided with a field in series with the circuit, a second field connected across its armature, and a third field connected across a source of constant potential, preferably the source of current. The second and third fields are connected to produce a magnetization which will produce an electro-motive force in the same direction as the source, while the first or series field produces a magnetization which will produce an electro-motive force opposite to that of the source. These fields will determine the value of the current and will maintain that value constant. The motor can therefore be safely reversed, and can be stopped by simply short-circuiting its field, without the objection above referred to, since the current is maintained constant. The third field is provided with a regulator to vary the value of the current and therefore the speed of the motor.

In the drawing the figure is a diagram showing this invention.

Referring to the drawing $e$ is a source of current, preferably a storage battery, which is connected in circuit with the driving motor $m$ which can be used for driving any suitable mechanism. In the drawing it is shown as driving the propeller $s$. The motor $m$ is provided with a field $d$ which in this case is a series field connected in the circuit by means of a reversing switch $u$. The regulating machine $b$ for regulating the speed of the motor has its armature connected in series circuit with the source of current $e$, and the motor $m$ and is driven by a driving motor $x$ connected across the terminals of the source $e$. The regulating machine $b$ is provided with a series field $h$ connected in series with the main circuit, a shunt field $g$ connected across the armature of the machine and a third field $f$ connected across a source of constant potential, the source of constant potential being in the specific embodiment shown, the source of current $e$. The field $f$ is provided with a regulator $r$ for a purpose hereinafter to be described.

The fields $g$ and $f$ produce a magnetization which will produce an electro-motive force in the same direction as the electro-motive force of the source $e$. The series field $h$ will produce a magnetization which will produce an electro-motive force which is opposed to the electro-motive force $e$. These fields are so proportioned that when the value of the current in the circuit is normal, the field $h$ will neutralize the fields $g$ and $f$. If therefore the current in the circuit should for any reason rise, the field $h$ will over-balance $g$ and $f$ and therefore the voltage of the circuit will drop and the current will be reduced to its former value. In a similar manner if the current in the circuit should drop, $g$ and $f$ will over-balance $h$, the reverse action will take place, and the current will remain constant. The value of this constant current may be varied by means of the regulator $r$ and any position of the regulator $r$ will determine the value of the constant current and this value will remain constant irrespective of the resistance of the circuit.

The speed of the motor $m$ may be varied by varying the value of the current traversing the circuit, that is, by adjusting the regulator $r$. The motor $m$ may be reversed in any suitable manner well known to those skilled in the art. In the present embodiment the motor, which is a series motor, is reversed by reversing the field leads by means of the reversing switch $u$. Since the current in the circuits is maintained constant, the objectionable short-circuit caused by reversing the ordinary counter-electromotive force, is not found here. The motor may be stopped by simply short-circuiting the field $d$ or by opening the circuit or in any other manner well known to those skilled in the art. In the specific construction shown the motor $m$ is shown as a series motor. It is not necessary however that this be a series motor for it may equally well be a shunt or a compound motor. The field of the dynamo-electric machine excited by its own means and that excited from a separate source can be replaced by a field supplied by the sum of the pressures of the separate and its own excitation. It is further obvious that various changes may be made without departing from the spirit of this invention and it is therefore to be understood that this invention is not to be limited to the specific construction shown and described.

Having thus described the invention what I claim is:

1. The combination with a source of current, of a motor connected to said source, a regulating dynamo-electric machine connected in circuit with said source and motor, means for causing said dynamo-electric machine to automatically maintain the current passing through said motor of a predetermined constant value, and controller means for varying the value of the current so maintained to vary the speed of the motor.

2. The combination with a source of current, of a motor connected to said source, a regulating dynamo-electric machine connected in circuit with said source and motor, means for causing said dynamo-electric machine to automatically maintain the current passing through said motor of a predetermined constant value, and controller means controlling said dynamo-electric machine for varying the value of the current so maintained to vary the speed of the motor.

3. The combination with a source of current, of a motor connected to said source, a dynamo-electric machine connected in circuit with said source and motor, a field winding for said dynamo-electric machine carrying current proportional to the current in said circuit, a second field winding connected across the armature of said dynamo-electric machine, and means for rendering the resultant field of said machine zero when a predetermined current traverses the circuit.

4. The combination with a source of current, of a motor connected to said source, a dynamo-electric machine connected in circuit with said source and motor, means for causing said machine to automatically maintain the current passing through said motor of a predetermined value, comprising a differential field winding for said dynamo-electric machine, and means for rendering the resultant field of said machine zero when such a predetermined current traverses the motor.

5. The combination with a source of current, of a motor connected to said source, a dynamo-electric machine connected in circuit with said source and motor, a field winding for said dynamo-electric machine carrying current proportional to the current in said circuit, a second field winding connected across the armature of said dynamo-electric machine, means for rendering the resultant field of said machine zero when a predetermined current traverses the circuit, and means to vary the value of the current.

6. The combination with a source of current, of a motor connected to said source, a dynamo-electric machine connected in circuit with said source and motor, a field winding for said dynamo-electric machine carrying current proportional to the current in said circuit, a second field winding connected across the armature of said dynamo-electric machine, and a third field winding connected across a source of constant potential, the second and third field windings neutralizing the first field winding when a predetermined current traverses the circuit.

7. The combination with a source of current, of a motor connected to said source, a dynamo-electric machine connected in circuit with said source and motor, a field winding for said dynamo-electric machine carrying current proportional to the current in said circuit, a second field winding connected across the armature of said dynamo-electric machine, a third field winding connected across said source, and a regulator for said third field winding, the second and third field windings neutralizing the first field winding when a predetermined current traverses the circuit.

8. The combination with a source of current, of a motor connected to said source, a dynamo-electric machine connected in circuit with said source and motor, a field winding for said dynamo-electric machine carrying current proportional to the current in said circuit, a second field winding connected across the armature of said dynamo-electric machine, a third field winding connected across said source, a regulator for said third field winding, the second and third field windings neutralizing the first field winding when a predetermined current traverses the circuit, and means for reversing the motor.

9. The combination with a source of current, of a motor connected to said source, a dynamo-electric machine having its armature connected in circuit with said source and motor, a field winding for said dynamo-electric machine excited by a current proportional to that supplied to the motor, and arranged to induce in said armature an electromotive force opposed to that of the circuit, and means for setting up a magnetic field in said dynamo-electric machine in opposition to the first field winding by the joint action of the terminal pressure of the dynamo-electric machine and another source of electromotive force.

10. The combination with a source of current, of a motor connected to said source, a dynamo electric machine having its armature connected in circuit with said source and motor, means for setting up in said dynamo electric machine a constant field, means for setting up a field proportional to the current traversing said motor, and means for setting up a field proportional to the voltage of said dynamo-electric machine.

11. The combination with a source of current, of a motor connected to said source, a dynamo-electric machine having its armature connected in circuit with said source and motor, means for setting up in said dynamo-electric machine a constant field, means for setting up a field proportional to the current traversing said motor, means for setting up a field proportional to the voltage of said dynamo-electric machine, and means for varying the value of said constant field.

In testimony whereof I have signed my name to this specification in the presence of two subscribing witnesses.

CHRISTIAN KRÄMER.

Witnesses:
JEAN GRUND,
ERWIN DIPPSELY.